United States Patent [19]

Kobayashi

[11] 4,435,060

[45] Mar. 6, 1984

[54] AUTOMATIC FILM WIND-UP CAMERA

[75] Inventor: Takumi Kobayashi, Tokyo, Japan

[73] Assignee: Asahi Kogaku Kogyo Kabushiki Kaisha, Tokyo, Japan

[21] Appl. No.: 346,768

[22] Filed: Feb. 8, 1982

[30] Foreign Application Priority Data

Feb. 6, 1981 [JP] Japan .................................. 56-15619

[51] Int. Cl.³ .............................................. G03B 1/12
[52] U.S. Cl. ................................ 354/173.1; 354/210; 354/213
[58] Field of Search ................. 354/21, 159, 173, 204, 354/206, 210, 212, 213

[56] References Cited

U.S. PATENT DOCUMENTS

| | | | |
|---|---|---|---|
| 3,073,229 | 1/1963 | Madge | 354/204 |
| 3,380,363 | 4/1968 | Sommermeyer | 354/204 |
| 3,613,540 | 10/1971 | Nakamura | 354/213 |
| 4,281,913 | 8/1981 | Shono et al. | 354/210 X |

OTHER PUBLICATIONS

*The Hasselblad Manual*, Focal Press, London, 1982, pp. 1-3 & 45,46.

Primary Examiner—John Gonzales
Attorney, Agent, or Firm—Browdy & Neimark

[57] ABSTRACT

An automatic film wind-up camera to which can be attached any of three film backs containing 120, 220 or 70 mm type film. Each film back is provided with a signalling mechanism varying with the type of film contained within the film back. The camera body includes a film frame indexing mechanism capable of winding-up any one of the three film types. The film frame indexing mechanism of the camera is set for winding-up the appropriate length of film by the signalling mechanism provided on the film back.

5 Claims, 11 Drawing Figures

AUTOMATIC FILM WIND-UP CAMERA

DETAILED DESCRIPTION OF THE INVENTION

This invention relates to an automatic film wind-up camera enabling three types of films having approximately equal size, i.e. roll film No. 120 (hereinafter called 120 film), roll film No. 220 (hereinafter called 220 film) and 70 mm roll film (hereinafter called 70 mm film) to be used.

Conventionally, respective cameras using these three types of films have carried out the leading end feed, wind-up and take-up of film in the following way; the 120 film and 220 film called usually brownie film are set in a camera with the triangle start mark written on the back of the roll film being registered with a predetermined position, and the leading end of the film is fed by wind-up until the index of first frame appears. Thereafter, the film is wound up after every exposure taken by a take-up spool after the exposure of a predetermined number of frames. On the other hand, the 70 mm film used for the movies is a naked perforated film having 70 mm width without the back sheet. The end of the film within the unexposed side magazine is set in a spool within the exposed side magazine and the leading end is fed by winding up the set and exposed portion. Then, the film is wound up after every exposure and taken up by the spool in the exposure side magazine to prevent the exposure after exposure of a predetermined number of frames.

Since the leading end feed, wind-up and take-up together with the length of film and take-up thus vary with the type of film, few cameras can use different types of films in common, though some cameras are known which can use in common two types of films, for example, 120 film and 220 film. The camera side of these cameras is provided with common and manual wind-up mechanisms and others, and each film back at the film back side is provided with the film indexing mechanism to enable one unit of the camera to carry out the leading end feed, wind-up and take-up.

Accordingly, though different types of films can be used in common by these cameras, film backs frequently used have respectively complicated mechanisms and high price.

An object of the present invention is to provide an automatic film wind-up camera in which each film back is provided with an attachment signalling means varying with the type of film while the camera side is provided with a film frame indexing mechanism capable of using different films in common so that the film back is simplified, permits low production cost, and different types of films can be used in common.

BRIEF DESCRIPTION OF THE DRAWINGS

Hereinafter will be described the present invention with reference to the drawings showing preferred embodiments of the present invention in which.

DETAILED DESCRIPTION OF THE INVENTION

Figure 11:
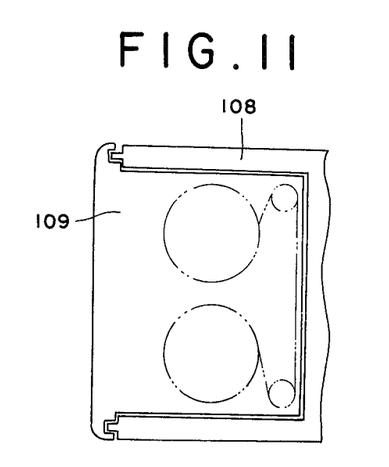
FIG. 11 is a schematic sectional view showing similarly the condition in which the film back is attached to the camera body.

An automatic film wind-up camera according to the present invention is constructed such that a film back 109 is attached removably to a camera body 108 as shown in FIG. 11. Three types of the film backs 109 are prepared to be applied to 120 film, 220 film and 70 mm film respectively.

Figure 1:
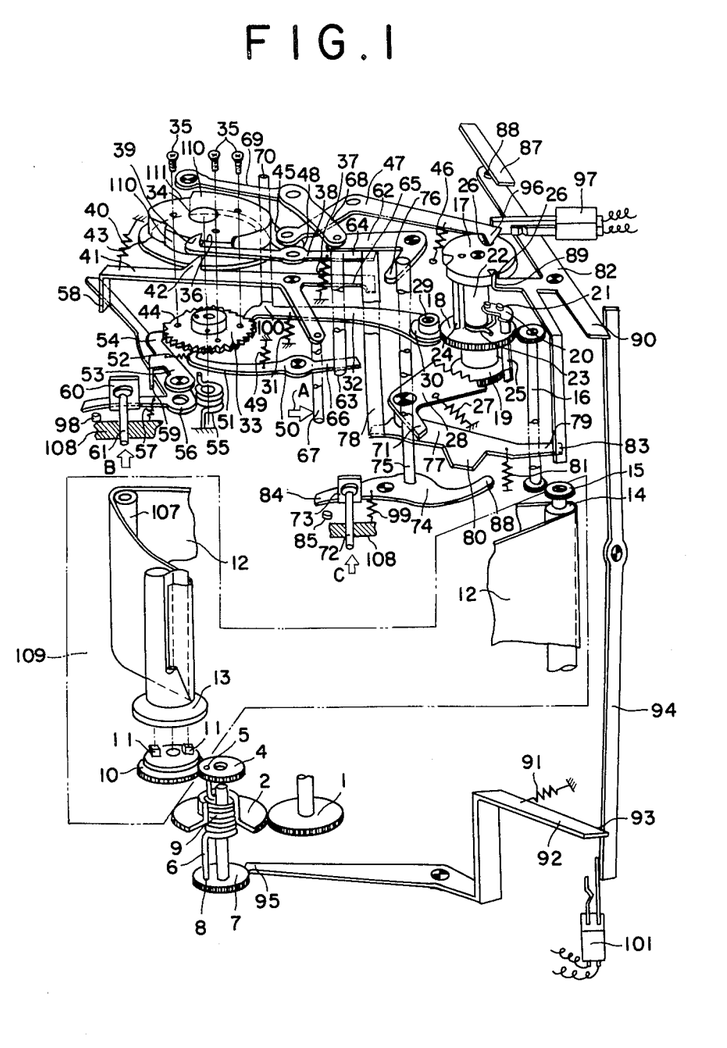
FIG. 1 is a perspective view showing an embodiment of the present invention.

The construction of the camera body 108 is shown in FIG. 1 by a perspective view. A gear 1 interlocked with a wind-up drive motor (not shown) meshes with a first wind-up gear 2. The first wind-up gear 2, a second wind-up gear 4 and a wind-up ratchet wheel 7 are arranged on the same axis, and a friction spring 9 wound around the axis has one end inserted into a hole 5 of the second wind-up gear 4 and the other end inserted into a hole 8 of the wind-up ratchet wheel 7 to make frictional contact with the inside of hollow cylindrical portion of the first wind-up gear 2 on the central coil portion, i.e. to constitute a clutch mechanism for winding up film.

The second wind-up gear 4 meshes with a spool gear 10 mounted on the film back 109 side. This film back 109 is provided with a spool 13 in which are fitted claws 11 projecting from the upper surface of spool gear 10. A film strip 12 is wound around a film supply side spool (not shown) from this spool 13 through a roller 107 and a counter roller 14 having a gear 15 for detecting a film feed amount. And the film back 109 is formed in a portion thereof with a particular shape which can signal which film is attached to the camera body, 120 film, 220 film or 70 mm film.

When this film back 109 is attached to the camera body 108, a double gears 16 meshs with the gear 15 in the camera body 108 while meshing with a cam gear 18 integrally fixed to the film frame indexing cam 17 by a fixing member 24. Also, the cam gear 18 is regulated by and fitted in a ratchet member 20 to pivot integrally with a clutch gear 19 only in one direction. The ratchet member 20 is pivotally supported by the upper end surface of the cam gear 18 and has a cut-out slot 21 on one end and on the other end a portion 25 meshing with the clutch gear 19. A spring 23 wound around a small diameter portion 22 of the clutch gear 19 has one end inserted into this cut-out slot 21 to permit intermittent movement. The film frame indexing cam 17 has recesses spaced from each other by a predetermined angle corresponding to the wind-up length of every film frame and on the same axis the clutch gear 19 meshing with a segment gear 28 urged to pivot clockwise by a spring 27. Also, the cam gear 18 arranged coaxially with the film frame indexing cam 17 meshes with a feed gear 29, and a feed member 32 which has an eccentric cam 30 fixed thereto and is fitted on a small diameter portion of a sheet (not shown) in eccentric relation to the axis of the feed gear 29 is urged counterclockwise by a spring 31 and attached to permit intermittent feed of film. A claw portion 100 of the feed member 32 engages a ratchet wheel 33 urged clockwise by a spring 55, and the ratchet wheel 33 has a toothless portion 44 and a wind-up control cam 34 fixed to the upper surface by screws 35 as a take-up control member for controlling auxilially take-up of film. The take-up control cam 34 has a projection 36 which engages both a hook 39 of a 120 film control member 38 urged clockwise by a spring 37 and a hook 42 of a 220 film control member 41 urged clockwise by a spring 40 to block the clockwise turning of the take-up control cam 34. Further, the take-up control cam 34 is provided with a large diameter circumferential portion 110 and a small diameter circumferential one 111. A recess 45 in a large diameter collar 43 of the take-up control cam 34 engages a roller 48 pivotably supported by an end of a film start signalling member 47 urged clockwise by a spring 46 and a projection 96 on the other end of the film start signalling member 47 engages the recess 26 on the film frame indexing cam 17. On the rear side of this projection 96 is arranged a reset switch 97 wired in a control circuit (not shown) for a counter for counting the number of exposed frames and operated by the pivotal movement of the film start signalling member 47.

The ratchet wheel 33 engages claws 51,54 of first and second stop members 50,53 respectively urged clockwise by springs 49,52 such that the claws 51,54 are positioned not to engage simultaneously the toothless portion 44 of the ratchet wheel 33. Each stroke of the intermittent film feed of the film member 32 will rotate the ratchet member 33 counterclockwise through an angle corresponding to one tooth thereof against the action of the spring 55. Upon each feed stroke of the feed member 32 at least one of the claws of the first and second stop members 50,53 goes over a tooth of the ratchet wheel 33, and then engages with it to prevent the ratchet wheel 33 from being rotated clockwise by the spring 55. A second releasing member 56 pivoted coaxially with the second stop member 53 is urged counterclockwise by a spring 57 having force stronger than reaction of spring 40 and 52 to bear against a bend 58 of the 220 film control member 41 and a bend 59 of the second stop member 53 and give respectively counterclockwise pivotal property to the 220 film control member 41 and second stop member 53. A pin 98 is a stopper for blocking the clockwise pivotal movement of the second releasing member 56. A 70 mm signalling member 61 projecting to the film back 109 side receives signals from the film back 109 side to be pushed in the direction of arrow B and abut against a bend 60 of the second releasing member 56. Further, the 120 film control member 38, 220 film control member 41 and first stop member 50 are fitted coaxially, and respective longer portions 64,66 of the 120 film control member 38 and first stop member 50 are adapted to bear against a pin 63 fixed to a third releasing member 62. A pin 67 is secured fixedly to and suspended from an end of the 220 film control member 41 to receive signals from the film pack 109 side in the direction of arrow A. A connecting member 68 is pivoted about the portion of the pin 63 fixed to the third releasing member 62 and the other end of the connecting member 68 is pivoted about an end of longer portion of a feed releasing member 69. The feed releasing member 69 is provided to bear against a bent 70 of the feed member 32 by counterclockwise turning and release the engagement between the ratchet wheel 33 and the feed member 32. A pin 75 secured fixedly to the first releasing member 74 having a bend 73 bearing against a signalling member 72 upon receiving signals from the film back 109 side in the direction of arrow C and urged counterclockwise by a strong spring 99 is provided to bear against a projection 71 of the segment gear 28 and also on its end against a longer portion 76 of the third releasing member 62 in the clockwise direction thereof. A holder member 77 provided coaxially with the segment gear 28 has a long bend 78 on one end, a longer portion 79 on the other end and a projection 80 on the intermediate portion and is urged clockwise by a spring 81. The longer portion 64 of the 120 film control member 38 and a longer portion 65 of the 220 film control member 41 are provided not to bear against the bend 78 when the respective hooks 39,42 are on the large diameter circumferential portion 110 of the take-up control cam 34. Then, the end surface of longer portion 79 of the holder member 77 is provided to stop the end side surface of a long bend 83 of a wind-up signalling member 82. The first releasing member 74 is provided to bear against the projection 80 on the longer portion 86, when it is turned counterclockwise, i.e. one end 84 thereof bears against a stopper 85, and turn counterclockwise the holder member 77 against a spring 81 for moving the end surface of longer portion 79 of the holder member 77 out of the operative orbid of the long bend 83 of wind-up signalling member 82. The wind-up signalling member 82 has a pin 88 fixed to one end and interlockingly bearing against a wind-up starting member 87 interlocked with a shutter charging mechanism (not shown), a bend 89 bearing against the side surface of the film frame indexing cam 17 and a longer portion 90 at the other end. The longer portion 90 is interlocked through a relay member 94 with one end 93 of a wind-up operative member 92 urged in the counterclockwise direction (clockwise direction in FIGS. 2-5) by a spring 91. The relay member 94 is provided on one end with a wind-up switch 101 for starting and stopping a wind-up drive motor (not shown) while sending signals to the control circuit (not shown) of a counter for the number of exposed film frame according to stop signals and indicating the number of exposed film frames on a indicator (not shown). The wind-up operative member 92 is provided on the other end with a claw 95 which engages and disengages from a clutch mechanism section for film wind-up.

Also, the film back 109 is provided on the outside with an attachment signalling means according to the type of film to send signals of the type of film attached to the camera body 108 to the first-third signalling members 61,67,72 for operating the film frame indexing mechanism and others when the film back 109 is attached to the camera body 108. In this embodiment, an attachment signalling means is provided which operates the first-third signalling members 61,67,72, when 120 film is attached, the first and third members 61,72 when 220 film is attached, and only the third signalling member 72 when 70 mm film is attached. Strictly speaking, the film back 109 for 120 film is a reference one. The film back 109 for 220 film is free from a portion for operating the second signalling member 67 and the film back 109 for 70 mm film is free from a portion for operating the first and second signalling members 61, 67.

Figure 2:
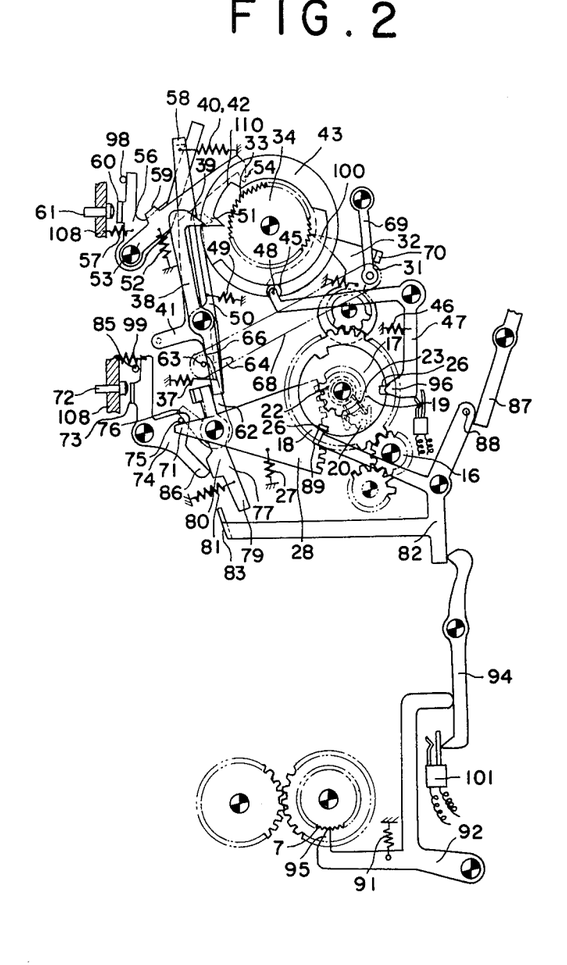
FIG. 2 is a plan view same embodiment to which a film back is not attached.

FIG. 2 shows the condition of the camera body 108 of such constitution when the film back 109 is not attached thereto.

Referring to FIG. 2, the first releasing member 74 is urged by a spring 99 to pivot counterclockwise and bear against the pin 85. The pin 75 secured fixedly to the first releasing member 74 bears against the longer portion 76 of the third releasing member 62 to turn clockwise the third releasing member 62. Since the pin 63 secured fixedly to the lower portion of the third releasing member 62 bears against the respective longer portions 64,66 of the 120 film control member 38 and the first stop member 50, the 120 film control member 38 and the first stop member 50 are turned counterclockwise respectively against the springs 37,49 so that the hook 39 of the 120 film control member 38 is located outside the large diameter circumferential portion 110 of said wind-up control cam 34 and the claw 51 of the first stop member 50 is located not to engage the ratchet wheel 33. The feed releasing member 69 turned counterclockwise through the connecting member 68 by the third releasing member 62 turned clockwise bears against the bend 70 of the feed member 32 against the spring 31 to disengage the claw 100 from the ratchet wheel 33.

On the one hand, the projection 71 of the segment gear 28 turned clockwise by the spring 27 bears against the pin 75 secured fixedly to the first releasing member 74, and the longer portion 86 of the first releasing member 74 bears against the projection 80 of the holder member 77 against the spring 81 to position the end surface of the longer portion 79 of the holder member 77 outside the operative orbid of the end surface of the bend 83 of the wind-up signalling member 82.

On the other hand, the second releasing member 56 is urged by the spring 57 to pivot counterclockwise and bear against the pin 98. It also bears against the bend 58 of 220 film control member 41 and the bend 59 of the second stop member 53 against the respective springs 40,52 for holding them in the respective counterclockwise turned positions. Then, the hook 42 of 220 film control member 41 is located outside the large diameter circumferential portion 110 of wind-up control cam 34, and the claw 54 of the second stop member 53 is located not to engage the ratchet wheel 33.

Since the wind-up signalling member 82 is urged through the relay member 94 by the spring 91 clockwise, the bend 89 engages the recess 26 on the film frame indexing cam 17. One of the other recesses 26 engages the projection 96 on one end of the film starting member 47 urged clockwise by the spring 46. The roller 48 pivoted in the other end of the film starting member 47 engages the recess 45 in the large diameter collar portion 43 of the take-up control cam 34.

When the shutter mechanism (not shown) is released under such condition without attaching the film back 109, the wind-up starting member 87 interlocked with the completion of travel of a shutter back curtain (not shown) is tunred clockwise to about against the pin 88, and the wind-up signalling member 82 is turned counterclockwise to disengage the bend 89 from the recess 26 on the film frame indexing cam 17 while the relay member 94 is turned clockwise to turn on the wind-up switch 101 for starting the wind-up drive motor (not shown). At the same time the wind-up operative member 92 is tunred counterclockwise (clockwise in FIG. 1) against the spring 91 to disengage the claw 95 from the ratchet wheel 7. The coil diameter of the frictional spring 9 forming a part of the clutch mechanism is not reduced so that the frictional spring 9 is coupled frictionally with the wind-up gear 2 to transmit drive force of the wind-up drive motor to the spool gear 10 side. Namely, the film wind-up clutch mechanism is under the engaged condition. However, since the film back 109 is not attached, such drive force is not transmitted from the counter roller 14 so that neither the double gears 16, nor the cam gear 18 rotates. Also, in spite of the reaction force of the spring 27, the recess 26 on the film frame indexing cam 17 engages the projection 96 on the other end of the film start signalling member 47 so that the film frame indexing cam 17 is held in the same position.

Next, when the shutter charge mechanism (not shown) is completely charged, the wind-up starting member 87 is turned counterclockwise an disengaged from the pin 88 to turn clockwise the wind-up signalling member 82 through the relay member 94 by the action of the spring 91. The bend 89 engages the recess 26 on the film frame indexing cam 17 while turning off the wind-up switch 101 by turning counterclockwise the relay member 94 to stop the drive motor (not shown). On the one hand, the claw 95 of the wind-up operative member 92 engages the wind-up ratchet wheel 7 to operate said clutch mechanism and interrupt the transmission from the gear 1 for completing the wind-up. Since the position of the film start signalling member 47 is not then changed, the reset switch 97 is kept turned on so that the control circuit (not shown) for counter for the number of frames is not operated and the indicator (not shown) of the number of frames keeps on indicating 0.

Next, before the film back 109 attached to the camera body 108 will be described, the usage of 120 film back without film will be first described with reference to FIG. 3. When the film back 109 is attached, the signalling member 72 and the 70 mm signalling member 61 abut against the attachment signalling means 102,103 formed in an portion of the film back 109 to be pressed rightward thereby. The signalling member 72 and the 70 mm signalling member 61 respectively press the bend 73 of the first releasing member 74 and the bend 60 of the second releasing member 56 to turn clockwise the first and second releasing members 74,56 respectively against the springs 99,57. By clockwise turning of the first releasing member 74 the longer portion 86 is diengaged from the projection 80 of the holder member 77 which is turned clockwise by the spring 81. By the pin 75 secured fixedly to the first releasing member 74 is pressed the projection 71 of the segment gear 28 to be turned counterclockwise against the spring 27 for turning clockwise the clutch gear 19 meshing with the segment gear 28. Then, the spring 23 wound around the small diameter portion 22 of the clutch gear 19 also tends to turn clockwise to turn counterclockwise the ratchet member 20 so that the clutch gear 19 is disengaged from the ratchet member 20. Since the band 89 of the wind-up signalling member 82 and the projection 96 of the film start signalling member 47 also respectively engage the recesses 26 on the film frame indexing cam 17, the cam gear 18 is not rotated so that the film frame indexing cam 17 is left held as it is.

Also, since the pin 75 is disengaged from the longer portion 76 of the third releasing member 62, the third releasing member 62 is turned counterclockwise by the spring 31 through the feed releasing member 69 and the connecting member 68. By this counterclockwise turning of the member 62 the claw 100 of the feed member 32 and said ratchet wheel 33 are retained in the engaging relation to each other while the pin 63 secured fixedly to the lower portion of the third releasing member 62 is disengaged from the longer portions 64,66 of the 120 film control member 38 and the first stop member 50 so that the 120 film control member 38 and the first stop member 50 are turned clockwise respectively by the springs 37,49. By this clockwise turning, the hook 39 of the 120 film control member 38 engages the recess 104 on the take-up control cam 34 and the longer portion 64 presses the bend 78 of the holder member 77 which is turned counterclockwise against the spring 81. The end surface of the longer portion 79 of the holder member 77 is retained outside the operative orbid of the long bend 83 of the wind-up signalling member 82. The claw 51 of the first stop member 50 is held in the engaging relation with the ratchet wheel 33.

On the one hand, by the clockwise turning of the second releasing member 56 and by the spring 52 the second stop member 53 is turned clockwise and the claw 54 of the second stop member 53 is retained in the position where it engages the ratchet wheel 33.

Also, though the 220 film control member 41 tends to be turned clockwise by said spring 40, since the film back 109 is used for 120 film, said pin 67 secured fixedly to the lower surface of one end of 220 film control member 41 is blocked by the 120 regulating member 105, i.e. one of the attachment signalling means for the film back 109, so that the hook 42 of 220 film control member 41 is located outside the large diameter circumferential portion 110 of the take-up control cam 34.

When the shutter mechanism (not shown) is released under such condition, since the film 12 is not loaded as same as the film back 109 is not attached to the camera body 108, the film frame indexing mechanism is not operated and the shutter charging mechanism (not shown) is completely charged by said operation. The detailed description of this charging is omitted herein.

Next, when the empty film back 109 for 220 film is attached to the camera body 108, the 120 regulating member 105 as the attachment signalling means is absent, and the 220 film control member 41 is turned clockwise by the spring 40 so that the hook 42 of the 220 film control member 41 engages the recess 104 on the take-up control cam 34. Also, the end surface of the longer portion 65 of 220 film control member 41 bears against the bend 78 of the holder member 77. Others are similar to the case in which the film back 109 for 120 film is used and detailed description of movement after shutter release is omitted since they are same as those in such case.

Figure 3:
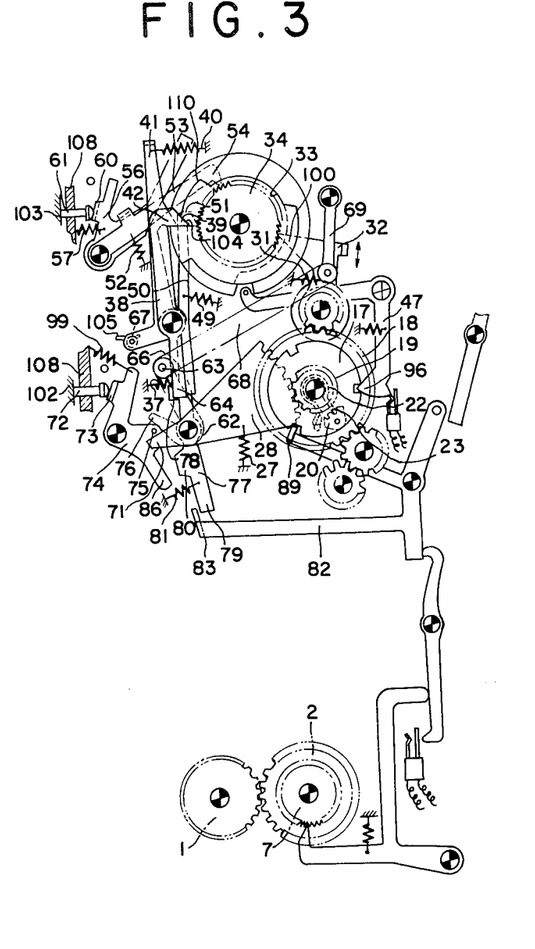
FIGS. 3, 4, 5 and 6 are plan views showing the respective operations of parts when 120 film back is attached.
Figure 4:
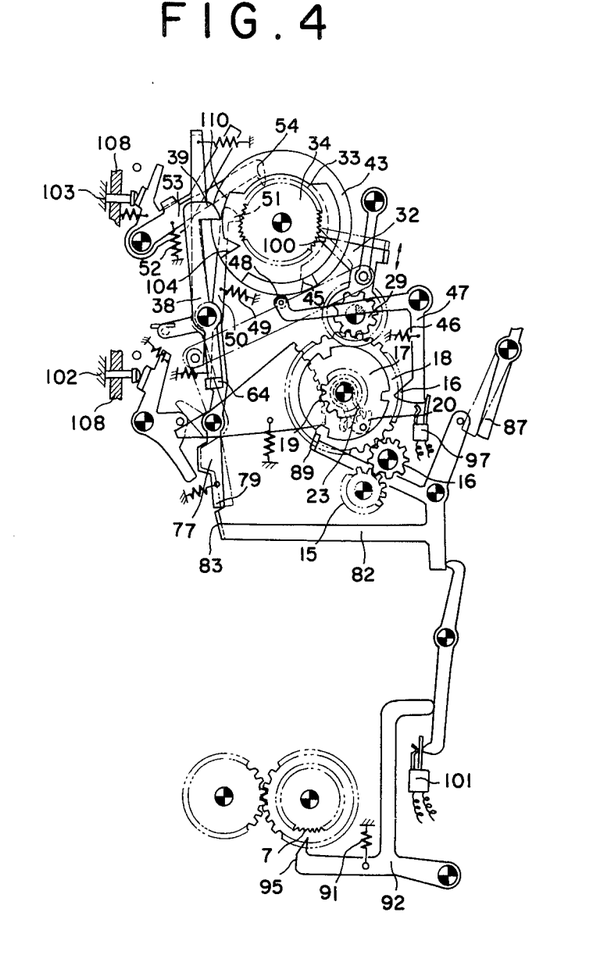

Next, when the 120 film (not shown) is loaded, the 120 film is at first loaded in the film back 109 as is well known and the film back is attached to the camera body 108 with the start mark being registered therewith in the positional relationship shown in FIG. 3. When the first releasing operation is then carried out, the shutter mechanism (not shown) is released as mentioned above and the wind-up starting member 87 is interlocked with the completion of travel of the shutter back curtain to turn clockwise as shown in FIG. 4. While the wind-up signaling member 82 is turned counterclockwise, said wind-up switch 101 is turned on to start the wind-up drive motor (not shown).

Since the wind-up operative member 92 is then turned counterclockwise (clockwise in FIG. 1) against the spring 91, the claw 95 of the wind-up operative member 92 is disengaged from the wind-up ratchet wheel 7 to place the clutch mechanism for film wind-up under the coupled condition so that the film 12 shown in FIG. 1 at the film back 109 side begines to be wound up. By the wind-up of the film 12, said counter roller 14 (shown in FIG. 1) at the film back 109 side is rotated to rotate the cam gear 18 counterclockwise through the gear 15 and the double gears 16 at the camera body 108 side. Since the ratchet member 20 pivoted in the upper end surface of the cam gear 18 is then turned counterclockwise by the spring 23, the clutch gear 19 is disengaged from the ratchet member 20 to rest without any rotation. The film frame indexing cam 17 integrally fixed to the cam gear 18 push up the projection 96 on the other end of the film start member 47 to turn counterclockwise the film start member 47 against the spring 46. At the same time the reset switch 97 is turned off to place the counter controlling circuit (not shown) under the condition ready for operation.

Further, the feed gear 29 meshing with the cam gear 18 also rotates to urge the swinging movement of the feed member 32 in the direction of arrow and the intermittent movement of the ratchet wheel 33 by the claw 100 of the feed member 32. When the ratchet wheel 33 is fed one tooth by the feed member 32, the respective teeth 51,54 of the first and second members 50,53 engage the ratchet wheel 33.

Since the hook 39 of 120 film control member 38 then run onto the large diameter circumferential portion 110 of the take-up control cam 34 from the recess 104 on the take-up control cam 34, the 120 film control member 38 is turned counterclockwise to turn clockwise the holder member 77 bearing against the longer portion 64 of the 120 film control member 38. The end surface of the longer portion 79 of the holder member 77 is located on the operative orbid of the long bend 83 of the wind-up signalling member 82.

Since the shutter charging mechanism (not shown) then has not completed the charging, the wind-up starting member 87 is left turned clockwise and the bend 83 of the wind-up signalling member 82 is located spaced from the end surface of the longer portion 79 of the holder member 77.

The roller 48 pivoted in one end of the film starting member 47 run onto the outer periphery of the large diameter collar 43 from the recess 45 provided on the large diameter collar 43 of the take-up control cam 34 and is held under such condition. Thereafter, when the shutter charging mechanism (not shown) has completed the charge, the wind-up starting member 87 tends to turn counterclockwise and the wind-up signalling member 82 tends to turn clockwise. However, since the end surface of the longer portion 79 of the holder member 77 is on the operative orbid of the bend 83 of the wind-up signalling member 82, the members 87,82 are stopped by the holder member 71 and held under the wind-up condition.

Figure 5:
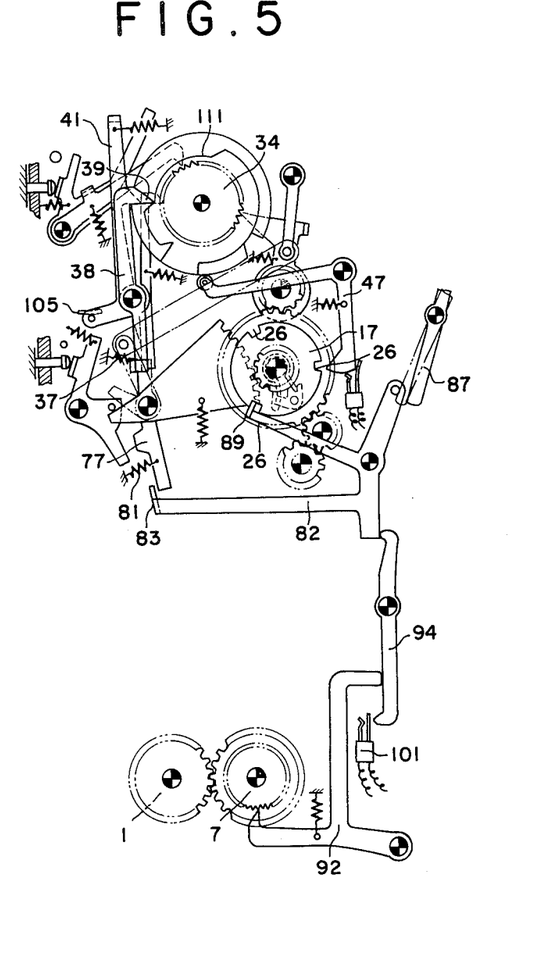

When under such condition the film 12 is wound up and in FIG. 5, before the first frame of the film 12 (FIG. 1) comes in the exposure area (not shown), the hook 39 of the 120 film control member 38 which was on the large diameter circumferential portion 110 of the take-up control cam 34 comes to the small diameter circumferential portion 111 of the take-up control cam 34, the 120 film control member 38 is turned clockwise by the spring 37 and the holder member 77 is turned counterclockwise against the spring 81 to turn clockwise the wind-up signalling member 82 which shunts the operative orbit of the long bend 83 of the wind-up signalling member 82. However, since the bend 89 of the wind-up signalling member 82 bears against the large diameter circumference of the film frame indexing cam 17, the wind-up switch 101 is left turned on to keep on winding up the film 12 (FIG. 1).

When the film 12 is kept on winding up, the film frame indexing cam 17 is rotated and the bend 89 drops into the next recess 26 so that the wind-up signalling member 82 is turned clockwise to turn off the wind-up switch 101 through the relay member 94 as shown in FIG. 5. The wind-up drive motor (not shown) is stopped and the exposure counter control circuit (not shown) interlocked with the turning-off of said wind-up switch 101 is operated so that the exposure indicator (not shown) indicates 1, while the wind-up operative member 92 is turned clockwise (counterclockwise in FIG. 1) to engage the wind-up ratchet wheel 7. Thus, the clutch mechanism for film wind-up is operatively held interrupted with respect to the transmission force so that the first frame of the film 12 is stopped in the exposure area (not shown) and the operation of automatic leading end feed is completed.

Next, the film 12 is exposed by the releasing of the shutter mechanism (not shown) from the first frame to the predetermined last one and after every exposure the hook 39 of the 120 film control member 38 moves along the small diameter circumferential portion 111 of the take-up control cam 34. The wind-up signalling member 82 thereby is not stopped by the holder member 77 so that the feed of one frame of the film 12 will be determined by a definite angular division of the film frame indexing cam 17. Also, at the completion of wind-up after every exposure, the exposure counter control circuit (not shown) is operated by signals of turned-off wind-up switch 101 to indicate the number of exposed frames on the exposure indicator (not shown).

Figure 6:
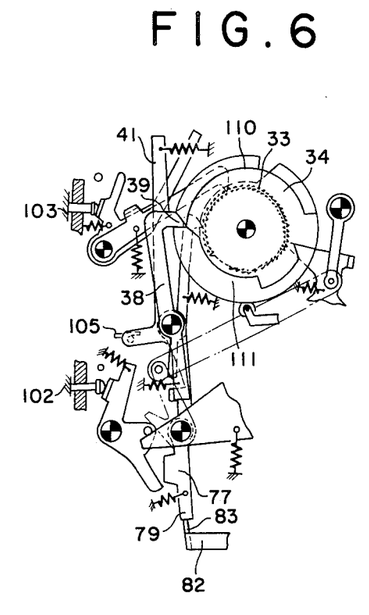

When the exposure of specified number of film frames is completed and the travel of shutter back curtain of the shutter charging mechanism (not shown) is completed, the wind-up starting member 87 is turned clockwise so that the wind-up switch 101 is turned on as mentioned above and the film 12 is wound up. As mentioned before, when the ratchet wheel 33 is fed only one tooth by the feed mechanism, the hook 39 of the 120 film control member 38 run onto the large diameter circumferential portion 110 of the take-up control cam 34 as shown in FIG. 6. Since then the shutter charging mechanism (not shown) is not completely charged, the wind-up sharting member 87 is left turned clockwise and the bend 83 of the wind-up signalling member 82 is located spaced from the end surface of the longer portion 79 of the holder member 77 so that the end surface of the longer portion 79 of the holder member 77 is located on the operative orbit of the bend 83 of the wind-up signalling member 82. After the completion of the shutter charge of the shutter charging mechanism (not shown), the bend 81 of the wind-up signalling member 82 bears against the end surface of the longer portion 79 of the holder member 77 so that the wind-up signalling member 82 is not returned to the original position. Thus, the take-up of the film 12 is completed by holding the wind-up switch 101 under the turned-off condition, continuing the take-up of the film 12, and taking up the film 12 to the take-up spool side through a switch (not shown).

When the film back 109 is removed from the camera body 108, all parts are returned to the original positions as shown in FIG. 2. However, when said take-up is completed and the terminal end of the film 12 passes by the counter roller 14, the counter roller stops its rotation and also the film frame indexing cam 17 is not rotated. The position in which the cam stops varies with the type of the film. Thus, to return the cam to the original position, the clutch gear 19 meshing with the segment gear 28 is turned counterclockwise when the segment gear 28 is turned clockwise by the spring 27, and the spring 23 wound around the small diameter portion 22 of the clutch gear 19 also tends to turn counterclockwise for turning clockwise the ratchet member 20 pivoted on the upper surface of the cam gear 18 and turning counterclockwise the film frame indexing cam 17 which will engage the clutch gear 19.

Since then the wind-up signalling member 82 and the film starting member 47 tend to return, the bend 89 and the projection 96 drops into the recess 26 on the film frame indexing cam 17 so that all parts return to the original positions. Also, the reset switch is turned on to operate the exposure counter control circuit (not shown) and return the figure on the exposure indicator to 0.

Next, the usage of 220 film will be described with reference to FIGS. 7 and 8. As mentioned before, since the film back 109 for the 220 film does not have the 120 regulating member 105, i.e. attachment signalling menas in the 120 film back, the 220 film control member 41 is located to be controlled by the take-up control cam 34. The leading end feed of the first frame from the start mark on the 220 film and the wind-up for exposure from the first frame to be specified last one in 120 film will be not described since they are operated similarly to those for the 120 film.

Figure 7:
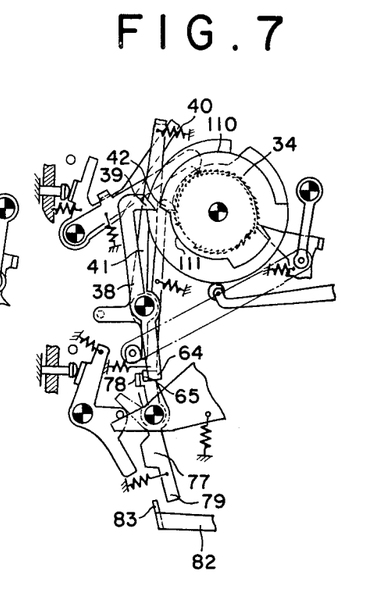
FIGS. 7 and 8 are plan views showing similarly the respective operations of parts when 220 film back is attached.
Figure 8:
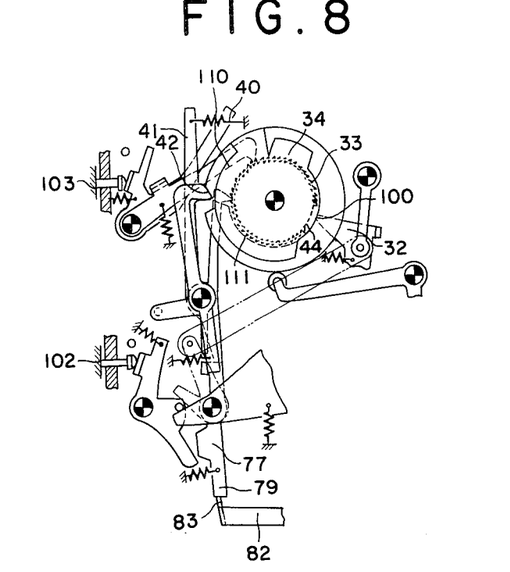

After the completion of exposure corresponding to the last 120 film frame, said wind-up is carried out so that the hook 39 of the 120 film control member 38 run onto the large diameter circumferential portion of the take-up control cam 34 and the longer portion 64 of the 120 film control member 38 is separated from the bend 78 of the holder member 77 as shown in FIG. 7. However, the hook 42 of 220 film control member 41 bears against the small diameter circumferential portion 111 of the take-up control cam 34 and the longer portion 65 of the 220 film control member 41 bears against the bend 78. Since the end surface of the longer portion 79 of the holder member 77 is outside the operative orbit of the bend 83 of the wind-up signalling member 82 not to stop the wind-up signalling member 82, the wind-up is stopped at the next frame similarly to that of one ordinarily exposed. Thereafter, the exposure and wind-up are repeated until the specified number of frames of 220 film are exposed. Further, the number of exposed frames is indicated on the exposure indicator (not shown) in the exposure counter control circuit (not shown) by the turning off the wind-up switch 101 similarly to that in the case of 120 film.

The movement of such mechanism is not described herein since it is similar to that in the case of said 120 film. When the travel of the shutter back curtain of the shutter mechanism (not shown) is completed similarly to the case of 120 film after the specified number of frames is exposed completely, the wind-up starting member 87 is turned clockwise to turn on the wind-up switch 101 through the wind-up signalling member 82, as mentioned before, for winding up the film 12. Further, when the take-up control cam 34 is fed one tooth of the ratchet wheel 33 by the feed mechanism, the hook 42 of the 220 film control member 41 run onto the large diameter circumferential portion 110 of the take-up control cam 34 as shown in FIG. 8. Since then as mentioned above the shutter charging mechanism is not charged the bend 83 of the wind-up signalling member 82 is located spaced from the end surface of the longer portion 79 of the holder member 77. Since the end surface of the longer portion 79 of the holder member 77 is located on the operative orbit of the bend 83 of the wind-up signalling member 82, it blocks the return of the wind-up signalling member 82 to the original position after the completion of the shutter charge of the shutter charging mechanism (not shown). The wind-up switch 101 is held under the turned-on condition and the take-up of the film 12 is continued to take up the film to the take-up spool side. Since then the toothless portion 44 of the ratchet wheel 33 comes to the operative position of the claw 100 of the feed member 32, the take-up control cam 34 stops its further rotation. When all exposure are completed as mentioned above and the film back 109 is removed from the camera body 108, all parts return to the original positions similarly to the case of said 120 film.

Figure 9:
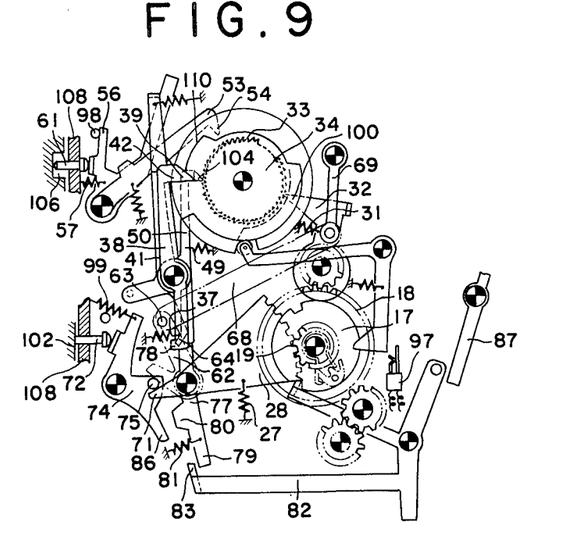
FIGS. 9 and 10 are plan views showing the respective operations of parts when 70 mm film back is similarly attached.
Figure 10:
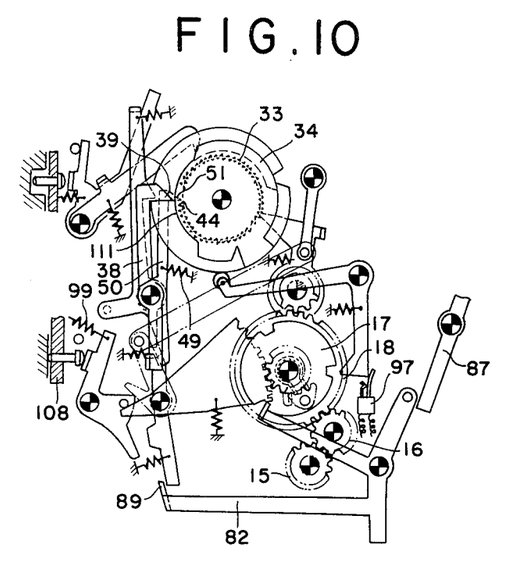

The usage of 70 mm film pack will be described with reference to FIGS. 9 and 10. The operation of parts in the 70 mm film pack contraining no film is similar to that in the 120 and 220 film backs containing no film and thus the description thereof is omitted herein. Also, when the 70 mm film is loaded, the unexposed side magazine (not shown) and the 70 mm film back 109 having film set to the spool within the exposed side magazine (not shown) are attached to the camera body 108 side. Then, as shown in FIG. 9, the signalling member 72 bears against a portion 102 of the film back 109 and is pressed rightward. The 70 mm film signalling member 61 enters the recess 106 of the 70 mm film pack not to be pressed by the portion 102. The first releasing member 74 is turned clockwise against the spring 99 by the signalling member 72 so that the longer portion 86 of the first releasing member 74 is disengaged from the projection 80 of the holder member 77, and the holder member 77 is turned clockwise by the spring 81. The projection 71 of the segment gear 28 is pressed by the pin 75 secured fixedly to the first releasing member 74 and the segment gear 28 is turned counterclockwise against the spring 27 to turn clockwise the clutch gear 19 meshing with the segment gear 28. As mentioned before, the clutch mechanism then interrupts the transmission force and the projection 96 of the film start signalling member 47 and the bend 89 of the wind-up signalling member 82 engage the recess 26 on the film frame indexing cam 17 so that the cam gear 18 does not rotate and the film frame indexing cam 17 is held as it is.

Also, since the pin 75 is disengaged from the third releasing member 62, the spring 31 turns counterclockwise the third releasing member 62 through the feed releasing member 61 and the connection member 68. By such counterclockwise turning, the claw 100 of the feed member 32 and said ratchet wheel 33 are retained in the engaged position. The pin 63 secured fixedly to the lower portion of the third releasing member 62 is disengaged from the 120 film control member 38 and the first stop member 50, and the 120 film control member 38 and the first stop member 50 are turned clockwise respectively by the springs 37,49. By such clockwise turning, the hook 39 of the 120 film control member 38 engages the recess 104 on the take-up control cam 34 and the longer portion 64 presses the bend 78 of the holder member 77 to turn counterclockwise the holder member 77 against the spring 81 so that the end surface of the longer portion 79 of the holder member 77 is held outside the operative orbit of the long bend 83 of the wind-up signalling member 82. Also, the hook 51 of the first stop member 50 is held in the position of engagement with the ratchet wheel 33.

On the one hand, since the 70 mm signalling member 61 is located in the same position as that it occupies when said film back 109 is not attached to the camera body 108, the second releasing member 56 is turned counterclockwise by the spring 57 to bear against the pin 98. Thus, the claw 54 of the second stop member 53 is located not to engage the ratchet wheel 33, and the hook 42 of the 220 film control member 41 is located outside the large diameter circumferential portion 110 of the take-up control cam 34. When the first releasing operation is carried out in said positional relationship, similarly to the case when said 120 film is used, the shutter mechanism (not shown) is released so that the wind-up signalling member 87 interlocked with the completion of travel of the shutter back curtain is turned clockwise. Then, the wind-up signalling member 82 is turned counterclockwise to turn on the wind-up switch 101 and start the wind-up drive motor (not shown).

The operation of leading end feed until the first frame appears thereafter is similar to that in the usage of the 120 film and thus the description of the operation is omitted. As was mentioned in the usage of the 120 film, however, the feed of the respective frames is determined by a definite angular division of the film frame indexing cam 17. As shown in FIG. 10, the take-up control cam 34 pivots until the toothless portion 44 between the first and last frames at 120 mm film in the ratchet wheel 33 pivots to the position of the claw 51 of the first stop member 50. When the toothless portion comes to this position, the claw 51 of the first stop member 50 cannot stop the ratchet wheel 33, but returns to the toothed portion so that the take-up control cam 34 does not pivot. Namely, since the hook 39 of the 120 film control member 38 is on the small diameter circumferential portion 111 of the take-up control cam 34, the feed of the respective frames is determined by the predetermined angular division of the film frame indexing cam 17 and thereafter exposure is carried out by winding up the film until the last frame. Also, the exposure counter control circuit (not shown), similarly to said 120 film and 220 film, is interlocked with the turning-off of the wind-up switch 101 to indicate the number of exposed frames on the exposure indicator (not shown).

When the travel of the shutter back curtain of the shutter mechanism (not shown) is completed after the completion of exposure of the last frame, the wind-up starting member 87 is turned clockwise and, as aforementioned, the wind-up switch 101 is turned on to wind-up the film 12. When the trailing end (not shown) of the film passes by the counter roller 14 shown in FIG. 1, the counter roller 14 stops its rotation and the cam gear 18 rotated through the gear 15 and double gear 16 stops its rotation. However, the bend 89 of the wind-up signalling member 82 bears against the large diameter side end surface of the film frame indexing cam 17 and the wind-up switch 101 is held in the turned-on condition. Thus, the film 12 is kept on winding-up and taken up by the spool in the exposure side magazine (not shown) to complete all exposures.

Further, when the film back 109 for the 70 mm film (not shown) is removed from the camera body 108, as shown in FIG. 2, the signalling member 72 is released from the rightward pressure so that the first releasing member 74 is turned counterclockwise by the spring 99 to return all parts to the condition in which the film back 109 is not attached. These operations are similar to those in the usage of the 120 film back and thus the description thereof is omitted.

As above described, the present invention can provide an automatic wind-up camera in which attachment signalling means varying with the type of film is provided in each film back, while the camera side is provided with a film frame indexing mechanism and others capable of being used in common to simplify the film back economically while permitting various types of films to be used in common by simply and removably attaching the film back.

GLOSSARY OF TERMS

1 ... gear; 2 ... first wind-up gear; 4 ... second wind-up gear; 7 ... ratchet wheel; 9 ... frictional spring; 10 ... spool gear; 12 ... film; 13 ... spool; 14 ... counter roller; 15 ... gear; 16 ... double gears; 17 ... film frame indexing cam; 18 ... cam gear; 19 ... clutch gear; 20 ... ratchet member; 23 ... spring; 27 ... spring; 28 ... segment gear; 29 ... feed gear; 30 ... eccentric cam; 31 ... spring; 32 ... feed member; 33 ... ratchet wheel; 34 ... take-up control member (take-up control cam); 35 ... screw; 37 ... spring; 38 ... 120 film control member; 40 ... spring; 41 ... 220 film control members; 46 ... spring; 47 ... film start signalling member; 48 ... roller; 49 ... spring; 50 ... first stop member; 52 ... spring; 53 ... second stop member; 55 ... spring; 56 ... second releasing member; 57 ... spring; 61 ... first signalling member; 62 ... third releasing member; 63 ... pin; 67 ... pin (second signalling member); 68 ... connecting member; 69 ... feed releasing member; 72 ... third signalling member; 74 ... first releasing member; 75 ... pin; 77 ... holder member; 81 ... spring; 82 ... wind-up signalling member; 85 ... stopper; 87 ... wind-up starting member; 88 ... pin; 91 ... spring; 92 ... wind-up operative member; 94 ... relay member; 97 ... reset switch; 98 ... pin; 99 ... spring; 101 ... wind-up switch; 102,103 ... attachment signalling means; 105 ... 120 regulating member (attachment signalling means); 107 ... roller; 108 ... camera body; 109 ... film back; 110 ... large diameter circumferential portion; 111 ... small diameter circumferential portion

What is claimed is:

1. An automatic film wind-up having a camera body provided with a film wind-up mechanism, a shutter charging mechanism, a shutter front curtain and a shutter back curtain interlocked with the shutter charging mechanism to travel when the shutter is released, a wind-up signalling member which is actuated upon completion of travel of the shutter back curtain, a film frame indexing mechanism, a counter for counting the number of exposed frames and an automatic film wind-up drive motor for driving said film wind-up mechanism and said shutter charging mechanism and capable of attaching removably three types of film backs formed with a means for signalling attachment of the respective films of roll film No. 120, roll film No. 220 and 70 mm film, characterized in that said camera body is provided with a film take-up control member for controlling automatic leading end feed and automatic take-up corresponding to the number of respective exposed frames of said three types of films, a ratchet wheel pivoting integrally with the take-up control member, a first film controlling member interlocked with said take-up control member to control the roll film No. 120, a second film controlling member interlocked with said take-up control member to control the roll film No. 220, a holder member interlocked with said first and second film controlling members to maintain said automatic wind-up drive motor at wind-up condition, a wind-up operative member regulated by the holder member and said film frame indexing mechanism, a wind-up switch interlocked with the wind-up operative member to start and stop said automatic wind-up drive motor, a film start signalling member which is actuated when the wind-up switch is turned on to start the wind-up of film, a reset switch interlocked with the film start signalling member for allowing the exposure counter to count the exposed frames when the reset switch is held in a prescribed state, a feed member interlocked with said film indexing mechahism to move intermittently said take-up control member, first and second stop members interlocked with said feed member to block return of said take-up control member, first, second and third signalling members for detecting the type of film from the film back when any one of said three types of film backs is attached to said camera body and first, second and third releasing members interlocked with the signalling members to release said stop members.

2. An automatic film wind-up camera as defined in claim 1, wherein the take-up control member is formed with stepped portions used differently for automatic leading film end feed, automatic unexposed film take-up and exposed film wind-up and the ratchet wheel is provided with a toothless portion, the first and second stop members being provided interlocked with the releasing members so as not to engage said toothless portion at the same time.

3. An automatic film wind-up camera as defined in claim 1, wherein the take-up control member has a large diameter collar portion on which slides a roller pivoted in an end of the film start signalling member and a portion of which is formed with a recess for receiving said roller.

4. An automatic film wind-up camera as defined in claim 1, wherein the film frame indexing mechanism is provided with a film frame indexing cam, a cam gear integral with the film frame indexing cam, a ratchet member pivotally supported on the cam gear, a clutch gear formed to mesh with the ratchet member only in one direction, a spring wound around a small diameter portion of the clutch gear and having one end engaged with the ratchet member and a segment gear meshing with the clutch gear and interlocked with one of said releasing members.

5. An automatic film wind-up camera as defined in claim 1, wherein the film start signalling member and the wind-up signalling member simultaneously engage recesses spaced by a definite angle on the film frame indexing cam.

* * * * *